United States Patent
Robertson, Jr. et al.

(10) Patent No.: US 11,148,609 B2
(45) Date of Patent: Oct. 19, 2021

(54) SENSOR AIRFLOW APPARATUS

(71) Applicant: Ford Global Technologies, LLC, Dearborn, MI (US)

(72) Inventors: Michael Robertson, Jr., Livonia, MI (US); Segundo Baldovino, Novi, MI (US); Venkatesh Krishnan, Canton, MI (US); Sunil Patil, Troy, MI (US); Raghuraman Surineedi, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 333 days.

(21) Appl. No.: 16/267,457

(22) Filed: Feb. 5, 2019

(65) Prior Publication Data
US 2020/0247329 A1 Aug. 6, 2020

(51) Int. Cl.
| | | |
|---|---|---|
| *B60S 1/54* | (2006.01) | |
| *G02B 7/02* | (2021.01) | |
| *B60R 11/04* | (2006.01) | |
| *G02B 7/00* | (2021.01) | |
| *G02B 27/00* | (2006.01) | |
| *B08B 5/02* | (2006.01) | |
| *B60R 11/00* | (2006.01) | |

(52) U.S. Cl.
CPC .............. *B60R 11/04* (2013.01); *B08B 5/02* (2013.01); *B60S 1/548* (2013.01); *G02B 7/006* (2013.01); *G02B 7/021* (2013.01); *G02B 27/0006* (2013.01); *B60R 2011/004* (2013.01)

(58) Field of Classification Search
CPC .... B60S 1/54; B60S 1/56; B60S 1/548; B60S 1/0848; B60R 11/04; B60R 2011/004; G02B 27/0006; G02B 7/021; G02B 7/006; B08B 17/02; B08B 5/02
See application file for complete search history.

(56) References Cited

U.S. PATENT DOCUMENTS

| | | |
|---|---|---|
| 2008/0285132 A1 | 11/2008 | O'Kane |
| 2015/0344001 A1 | 12/2015 | Lopez Galera et al. |
| 2017/0259789 A1 | 9/2017 | McAndrew |
| 2019/0384313 A1* | 12/2019 | Toth ............... H04N 5/2252 |

FOREIGN PATENT DOCUMENTS

| | | | |
|---|---|---|---|
| JP | 2006320780 A | 11/2006 | |
| JP | 201882384 A | 5/2018 | |
| WO | 2016004936 A1 | 1/2016 | |
| WO | WO-2018220175 A1 * | 12/2018 | ........... B60S 1/54 |
| WO | WO-2018231070 A1 * | 12/2018 | ........... B08B 1/006 |

* cited by examiner

*Primary Examiner* — Irina Graf
(74) *Attorney, Agent, or Firm* — Frank A. MacKenzie; Bejin Bieneman PLC

(57) ABSTRACT

An apparatus includes a housing defining a chamber and including a panel including at least one aperture, at least one sensor fixed inside the chamber and having a field of view through a lens and the aperture, at least one annular disc attached to the sensor concentrically around the lens and including a radially outer edge contactlessly exposed to the chamber, and at least three vanes extending from the disc to the panel and arranged radially asymmetrically around the disc.

20 Claims, 11 Drawing Sheets

SENSOR AIRFLOW APPARATUS

BACKGROUND

Vehicles typically include sensors. The sensors can provide data about operation of the vehicle, for example, wheel speed, wheel orientation, and engine and transmission data (e.g., temperature, fuel consumption, etc.). The sensors can detect the location and/or orientation of the vehicle. The sensors can be global positioning system (GPS) sensors; accelerometers such as piezo-electric or microelectromechanical systems (MEMS); gyroscopes such as rate, ring laser, or fiber-optic gyroscopes; inertial measurements units (IMU); and/or magnetometers. The sensors can detect the external world, e.g., objects and/or characteristics of surroundings of the vehicle, such as other vehicles, road lane markings, traffic lights and/or signs, pedestrians, etc. For example, the sensors can be radar sensors, scanning laser range finders, light detection and ranging (LIDAR) devices, and/or image processing sensors such as cameras.

DETAILED DESCRIPTION

Figure 1:
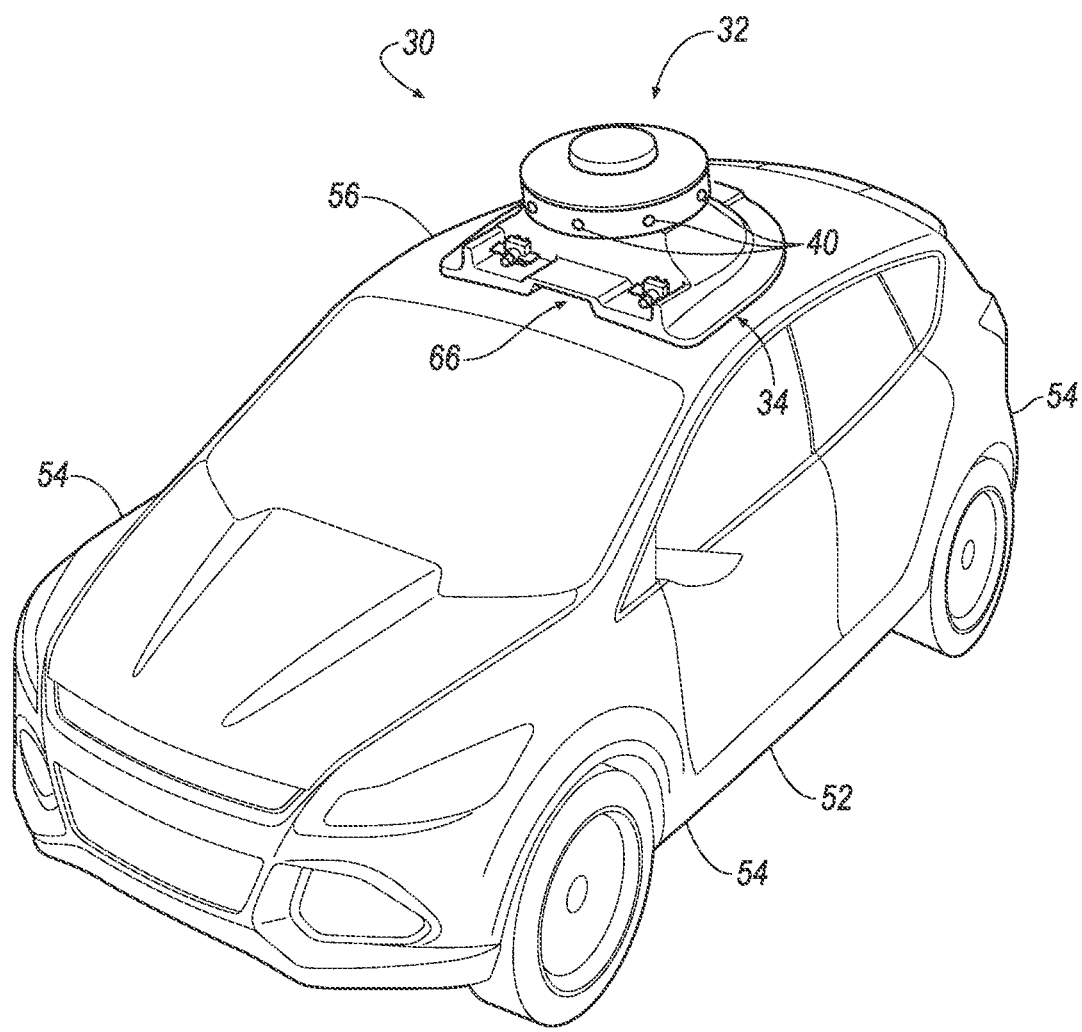
FIG. 1 is a perspective view of an example vehicle.

An apparatus includes a housing defining a chamber and including a panel including an aperture, a sensor fixed inside the chamber and having a field of view through a lens and the aperture, an annular disc attached to the sensor concentrically around the lens and including a radially outer edge contactlessly exposed to the chamber, and at least three vanes extending from the disc to the panel and arranged radially asymmetrically around the disc.

The vanes may define a plurality of first openings positioned to direct airflow from the chamber in substantially a same first direction across the lens, and a second opening positioned to direct airflow from the chamber across the lens in a second direction transverse to the first direction. The vanes may be positioned to block airflow from the chamber through the aperture except through the first openings and second opening.

The second direction may be at an acute angle with the first direction.

The plurality of first openings may include at least three first openings.

The aperture may include a circular portion substantially centered on the lens and an extension portion. The extension portion may extend in the first direction from the circular portion.

The vanes may include first vanes arranged radially symmetrically for at least 270° around the disc. The first vanes may be each elongated in a radial and circumferential direction.

The vanes may include second vanes arranged around a remainder of the disc radially asymmetrically with the first vanes. The second vanes may be elongated in a radial direction.

The disc may include a radially inner surface at which the disc is attached to the sensor. The disc may include a front surface sloping away from the panel from the radially inner surface to the radially outer edge.

The disc may include a back surface facing away from the panel and extending from the radially inner surface to the radially outer edge, and the back surface may be contactlessly exposed to the chamber.

The apparatus may further include a pressure source positioned to raise a pressure of the chamber above an atmospheric pressure. The pressure source may be a blower.

The lens may be convex.

The panel may have a cylindrical shape.

The sensor may be a first sensor, the aperture may be a first aperture, the lens may be a first lens, and the apparatus may further include a second sensor fixed inside the chamber, and the panel may include a second aperture, and the second sensor may include a second lens defining a field of view oriented through the second aperture. The disc may be a first disc, the radially outer edge may be a first radially outer edge, and the vanes may be first vanes, and the apparatus may further include an annular second disc attached to the second sensor concentrically around the second lens and including a second radially outer edge contactlessly exposed to the chamber, and at least three second vanes extending from the second disc to the panel and arranged radially asymmetrically around the second disc.

With reference to the Figures, an apparatus 32 for a vehicle 30 includes a housing 34 defining a first chamber 36 and including a panel 38 including at least one aperture 40, at least one sensor 42 fixed inside the first chamber 36 and having a field of view through a lens 44 and the aperture 40, at least one annular disc 46 attached to the sensor 42 concentrically around the lens 44 and including a radially outer edge 48 contactlessly exposed to the first chamber 36, and at least three vanes 50 extending from the disc 46 to the panel 38 and arranged radially asymmetrically around the disc 46.

The apparatus 32 provides airflow across the lens 44 of the sensor 42. The airflow can dry the lens 44 and prevent moisture such as rain from contacting the lens 44. The airflow can be provided across an entirety of the lens 44 without dead spots, i.e., regions of still air. The apparatus 32 can efficiently provide these benefits with a small number of parts and with a small packaging space. The apparatus 32 keeps components other than the lens 44 concealed behind the panel 38, protecting the components from the ambient environment while providing a pleasing, sleek design.

With reference to FIG. 1, the vehicle 30 may be any passenger or commercial automobile such as a car, a truck, a sport utility vehicle, a crossover vehicle, a van, a minivan, a taxi, a bus, etc.

The vehicle 30 may be an autonomous vehicle. A computer can be programmed to operate the vehicle 30 independently of the intervention of a human driver, completely or to a lesser degree. The computer may be programmed to operate the propulsion, brake system, steering, and/or other vehicle systems. For the purposes of this disclosure, autonomous operation means the computer controls the propulsion, brake system, and steering without input from a human driver; semi-autonomous operation means the computer controls one or two of the propulsion, brake system, and steering and a human driver controls the remainder; and nonautonomous operation means a human driver controls the propulsion, brake system, and steering. The computer relies on data from the sensors 42 to autonomously or semi-autonomously operate the vehicle 30.

The vehicle 30 includes a body 52. The vehicle 30 may be of a unibody construction, in which a frame and the body 52 of the vehicle 30 are a single component. The vehicle 30 may, alternatively, be of a body-on-frame construction, in which the frame supports the body 52 that is a separate component from the frame. The frame and the body 52 may be formed of any suitable material, for example, steel, aluminum, etc. The body 52 includes body panels 54, 56 partially defining an exterior of the vehicle 30. The body panels 54, 56 may present a class-A surface, e.g., a finished surface exposed to view by a customer and free of unaesthetic blemishes and defects. The body panels 54, 56 include, e.g., a roof 56, etc.

Figure 2:
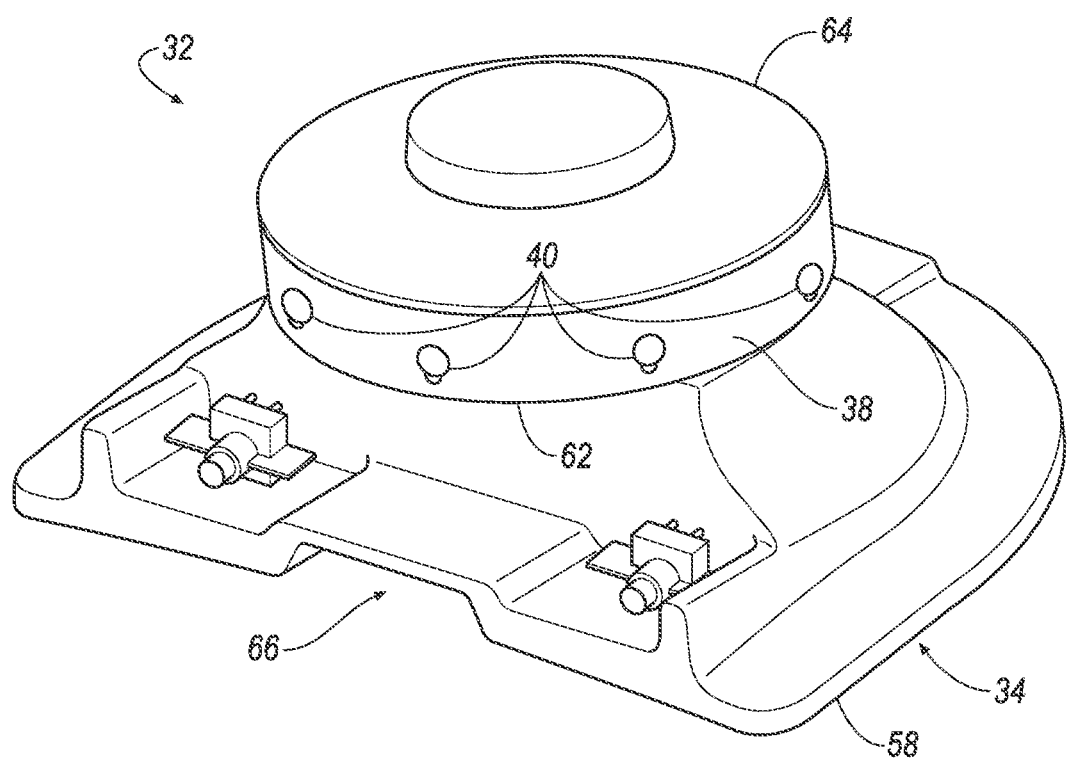
FIG. 2 is a perspective view of an example housing on the vehicle.

With reference to FIGS. 1 and 2, the housing 34 for the sensors 42 is attachable to the vehicle 30, e.g., to one of the body panels 54, 56 of the vehicle 30, e.g., the roof 56. For example, the housing 34 may be shaped to be attachable to the roof 56, e.g., may have a shape matching or following a contour of the roof 56. The housing 34 may be attached to the roof 56, which can provide the sensors 42 with an unobstructed field of view of an area around the vehicle 30. The housing 34 may be formed of, e.g., plastic or metal.

Figure 3:
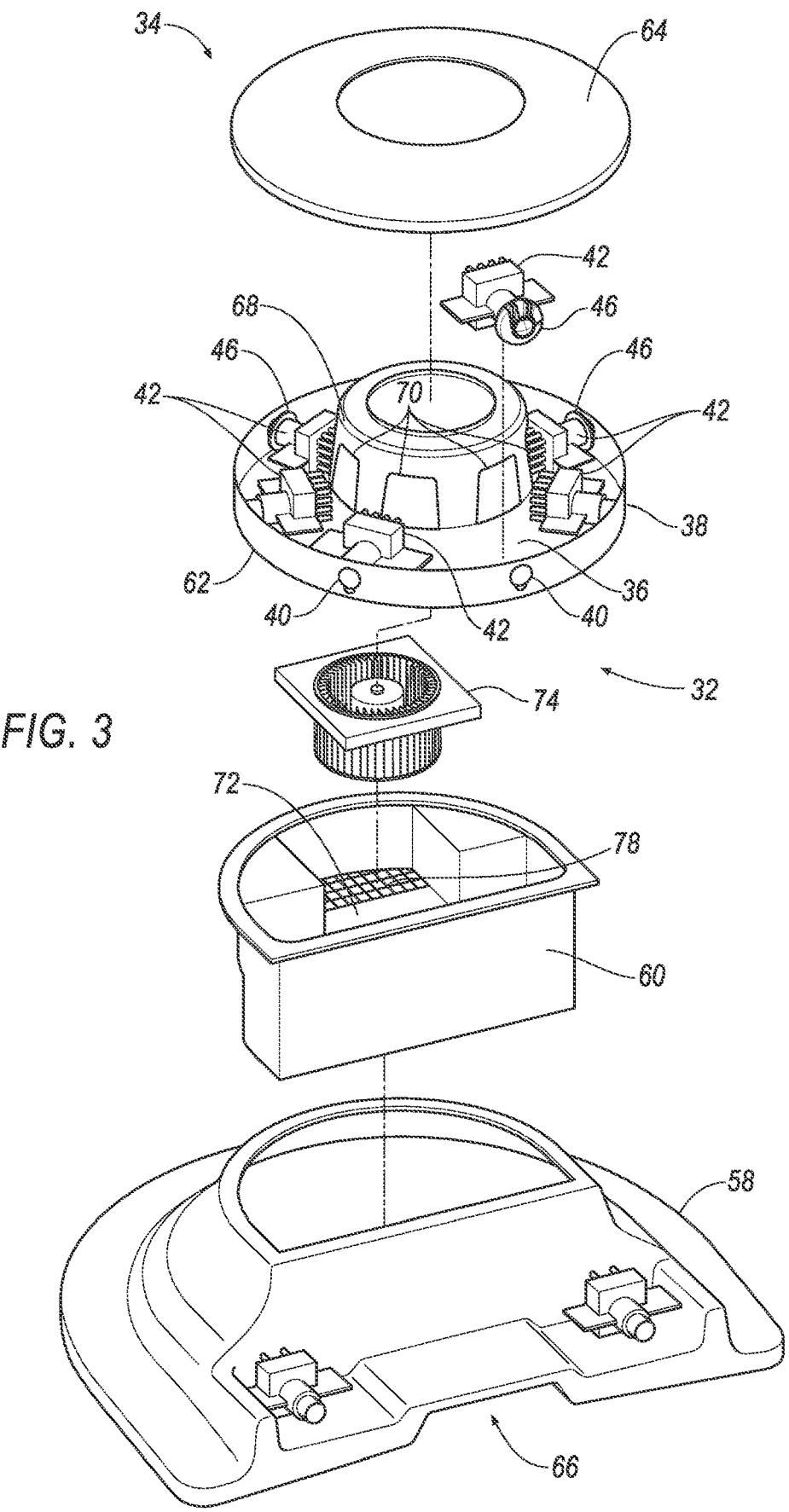
FIG. 3 is an exploded view the housing.

With reference to FIG. 3, the housing 34 includes a base 58, a bucket 60, a tray 62, and a top cover 64. The base 58 is attached to the roof 56 and includes an intake opening 66. The intake opening 66 is positioned to face forward when the housing 34 is mounted on the vehicle 30. The base 58 has a bottom surface shaped to conform to the roof 56 of the vehicle 30 and a top surface with an opening shaped to receive the bucket 60.

The bucket 60 sits in the base 58. The bucket 60 is a container with an open top, i.e., a tubular shape with a closed bottom and an open top. The bucket 60 includes a lip at the top shaped to catch on the top of the base 58. The bucket 60 has a substantially constant cross-section along a vertical axis between the top and the bottom.

The tray 62 sits on top of the base 58 and the bucket 60. The sensors 42 are disposed in the tray 62. The tray 62 includes the panel 38, which serves as a circumferential outer wall, and the tray 62 includes a circumferential inner wall 68. The panel 38 and the inner wall 68 each has a cylindrical shape. The tray 62 includes a floor extending radially outward from the inner wall 68 to the panel 38. The apertures 40 are in the panel 38. The inner wall 68 includes tray openings 70 positioned radially inwardly from respective sensors 42 relative to the tray 62.

The top cover 64 is attached to the tray 62 and encloses the tray 62 from the inner wall 68 to the panel 38. The tray 62 includes a hole sized to receive the inner wall 68 of the tray 62. The top cover 64 extends radially outward relative to the tray 62 from the inner wall 68 to the panel 38. The tray 62 and the top cover 64 together form a toroidal shape.

Figure 4:
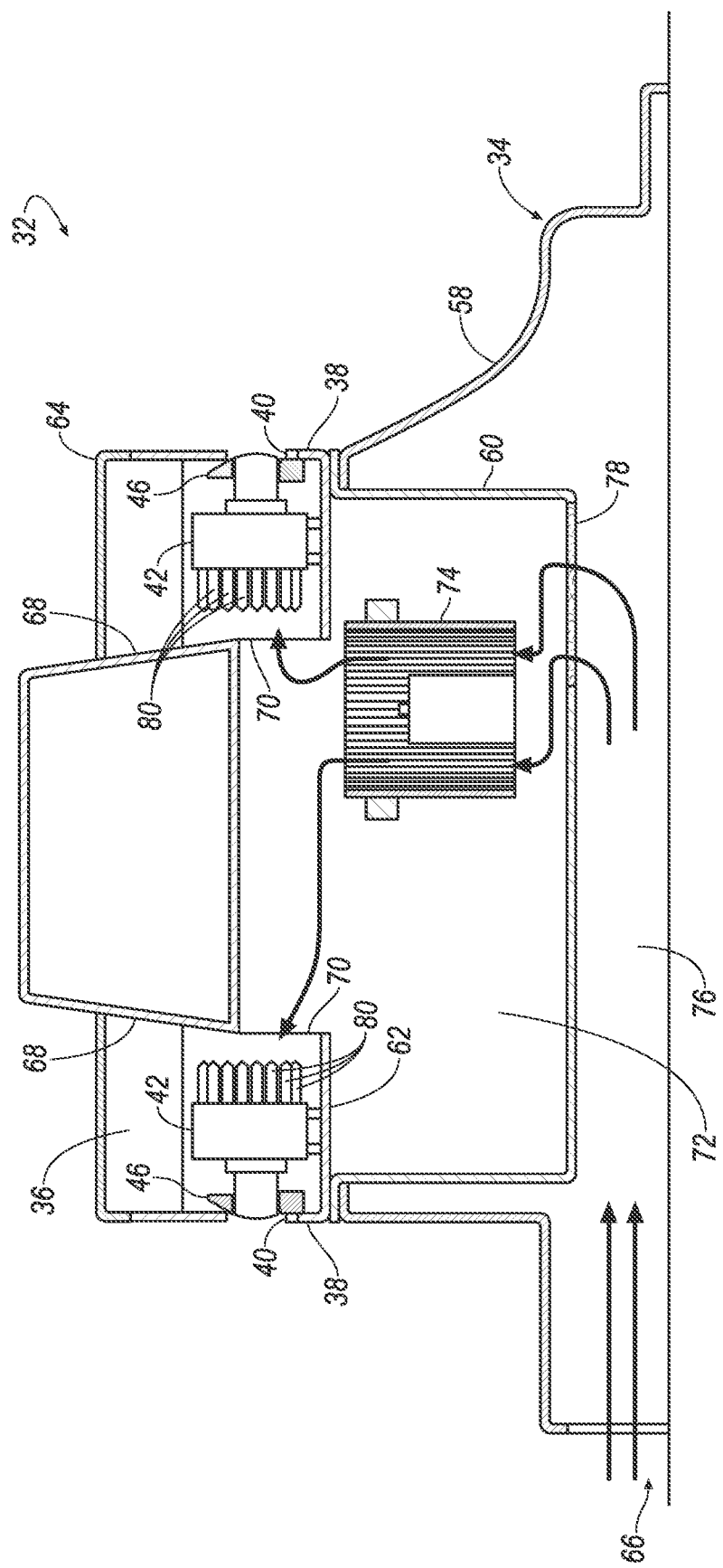
FIG. 4 is a side cross-sectional view of the housing.

With reference to FIG. 4, the housing 34 defines the first chamber 36 in which the sensors 42 are disposed, and the housing 34 defines a second chamber 72 in which a pressure source 74 is disposed. The first chamber 36 may be disposed above the second chamber 72. For example, the tray 62 and the top cover 64 enclose and constitute, i.e., form, the first chamber 36. For example, the base 58 and the bucket 60 enclose and constitute the second chamber 72, as shown in FIG. 4. Alternatively, one or more of the body panels 54, 56, e.g., the roof 56, may partially enclose and constitute the second chamber 72 along with the base 58 and/or bucket 60.

The pressure source 74 increases the pressure of a gas occupying the first chamber 36. For example, the pressure source 74 can be a blower, which forces additional gas from a lower-pressure region to a higher-pressure region. The pressure source 74 can be any suitable type of blower, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; a fan; or any other suitable type.

The pressure source 74 is positioned to raise a pressure of the first chamber 36 above an atmospheric pressure. For example, the pressure source 74 is positioned to draw air from an ambient environment outside the housing 34 and to blow the air into the first chamber 36. The pressure source 74 is disposed in the second chamber 72 outside the first chamber 36, e.g., attached to the bucket 60 inside the bucket 60. For example, air enters through the intake opening 66, travels through a passageway 76 below the second chamber 72, travels through a filter 78 leading through a bottom of the bucket 60, and then travels to the pressure source 74. The filter 78 removes solid particulates such as dust, pollen, mold, dust, and bacteria from air flowing through the filter 78. The filter 78 may be any suitable type of filter, e.g., paper, foam, cotton, stainless steel, oil bath, etc. The pressure source 74 blows the air into the second chamber 72, and the air travels through the tray openings 70 into the first chamber 36.

Alternatively to the pressure source 74 being a blower, the apparatus 32 may pressurize the first chamber 36 of the housing 34 in other ways. For example, forward motion of the vehicle 30 may force air through passageways leading to the first chamber 36.

The housing 34 includes the apertures 40. The apertures 40 are holes in the housing 34 leading from the first chamber 36 to the ambient environment. The apertures 40 are through the panel 38 of the tray 62. The housing 34 includes one aperture 40 for each of the sensors 42. Each sensor 42 has a field of view received through the respective aperture 40. The sensors 42 may extend into the respective apertures 40. For example, the aperture 40 may be concentric about a portion of the sensor 42, e.g., the lens 44.

Figure 5:
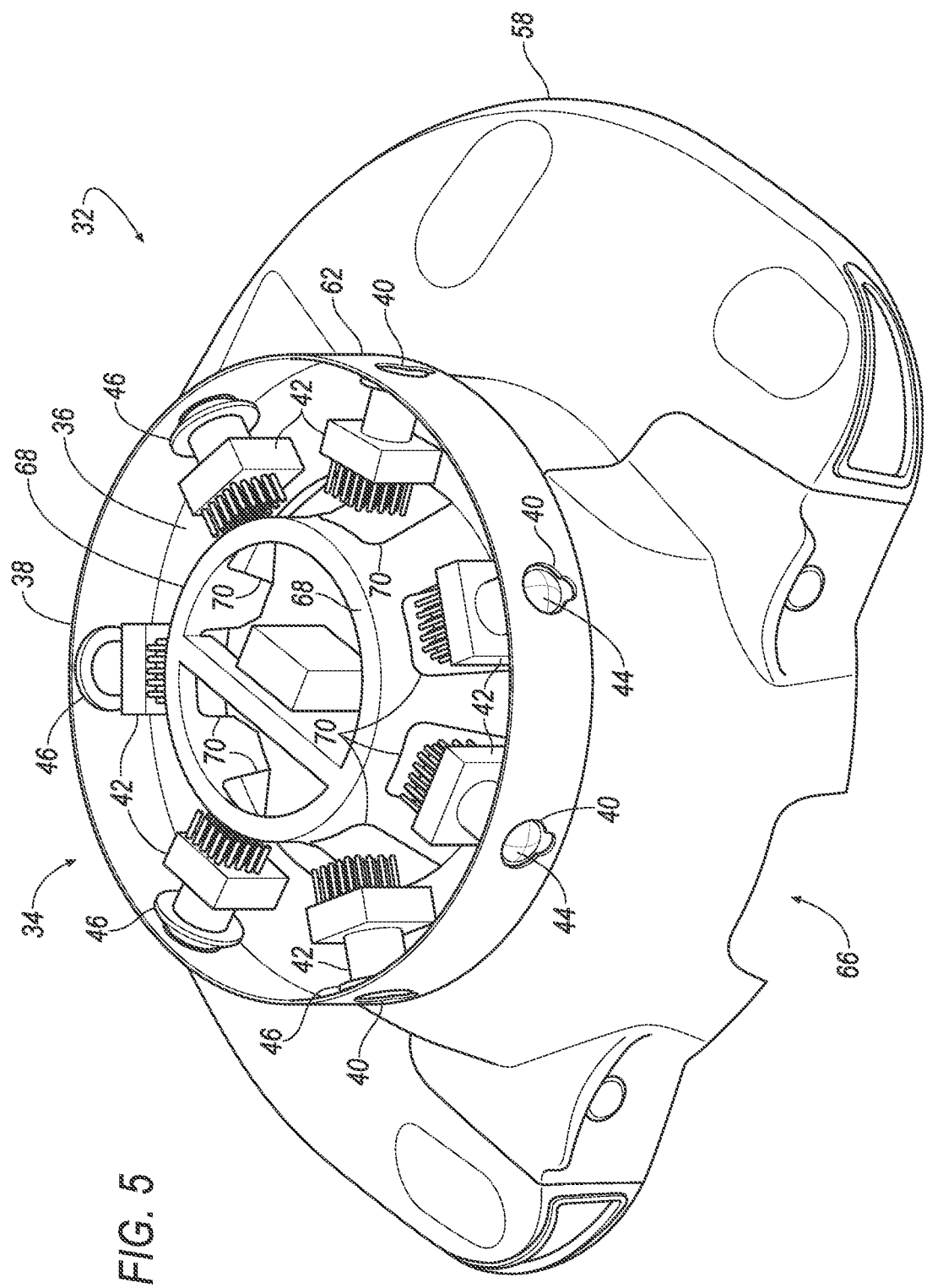
FIG. 5 is a perspective view of the housing with a chamber exposed for illustration.

With reference to FIG. 5, the sensors 42 may detect the external world, e.g., objects and/or characteristics of surroundings of the vehicle 30, such as other vehicles, road lane markings, traffic lights and/or signs, pedestrians, etc. For example, the sensors 42 may include radar sensors, scanning laser range finders, light detection and ranging (LIDAR) devices, and image processing sensors such as cameras.

Figure 6:
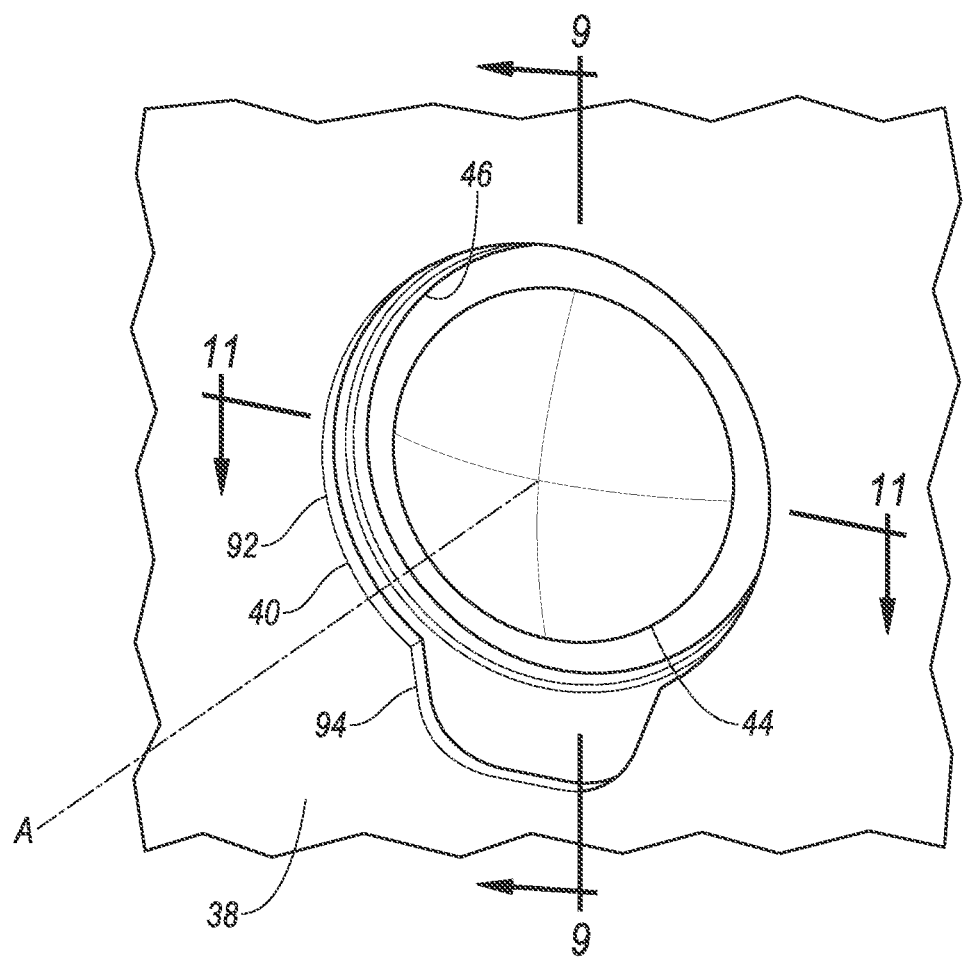
FIG. 6 is a perspective view of a portion of the housing.

In particular, with reference to FIGS. 5 and 6, the sensors 42 disposed in the housing 34 may be one or more cameras arranged to collectively cover a 360° field of view with respect to a horizontal plane. The sensors 42 are fixed inside the first chamber 36. The sensors 42 are fixedly attached directly or indirectly to the housing 34. Each sensor 42 has a field of view through the respective lens 44 and the respective aperture 40, and the field of view of one of the sensors 42 may overlap the fields of view of the sensors 42 that are circumferentially adjacent to one another, i.e., that are immediately next to each other. The lenses 44 may be convex.

Figure 7:
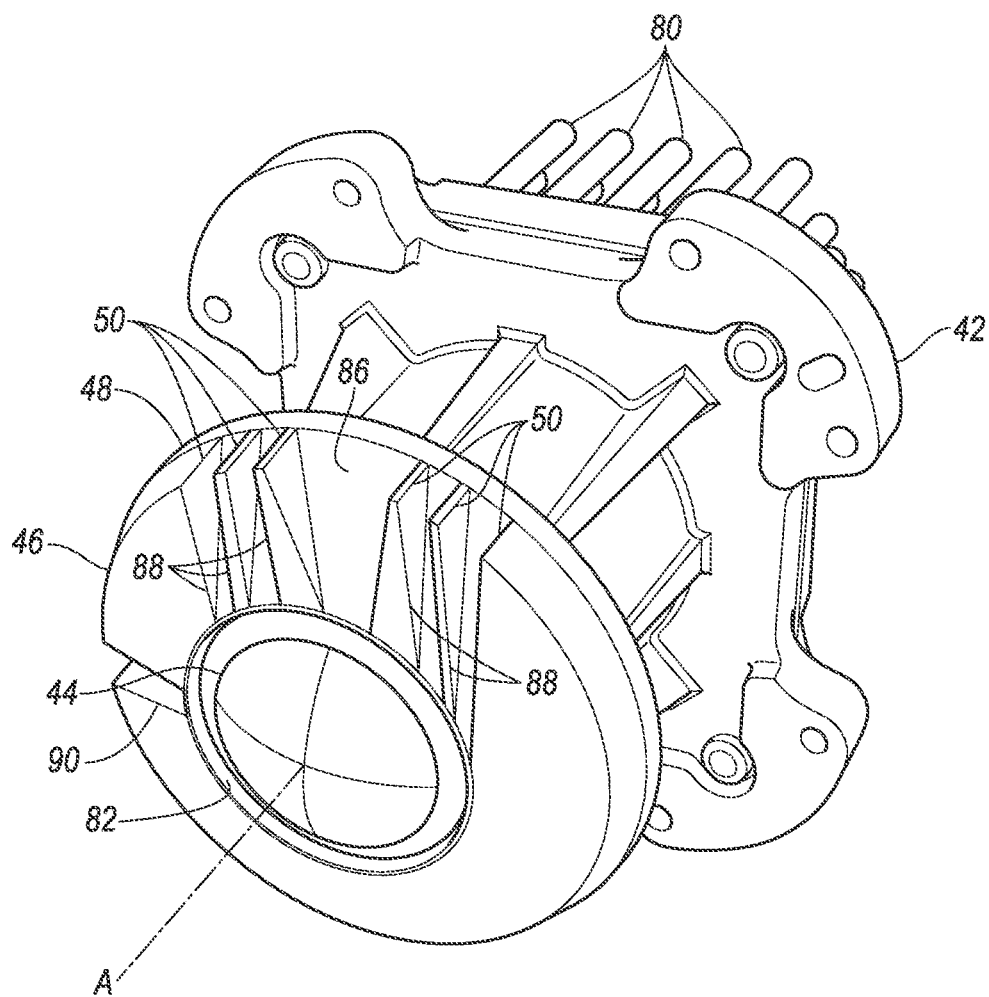
FIG. 7 is a perspective view of an example sensor and disc.

With reference to FIG. 7, each sensor 42 includes a plurality of fins 80. The fins 80 are thermally conductive, i.e., have a high thermal conductivity, e.g., a thermal conductivity equal to at least 15 watts per meter-Kelvin (W/(m K)), e.g., greater than 100 W/(m K), at 25° C. For example, the fins 80 may be aluminum. The fins 80 are shaped to have a high ratio of surface area to volume, e.g., long, thin poles or plates.

Each disc 46 is attached to one of the sensors 42 concentrically around the lens 44 of that sensor 42. The disc 46 may be attached in any suitable manner, e.g., adhesive, interference fit, etc.

Figure 8:
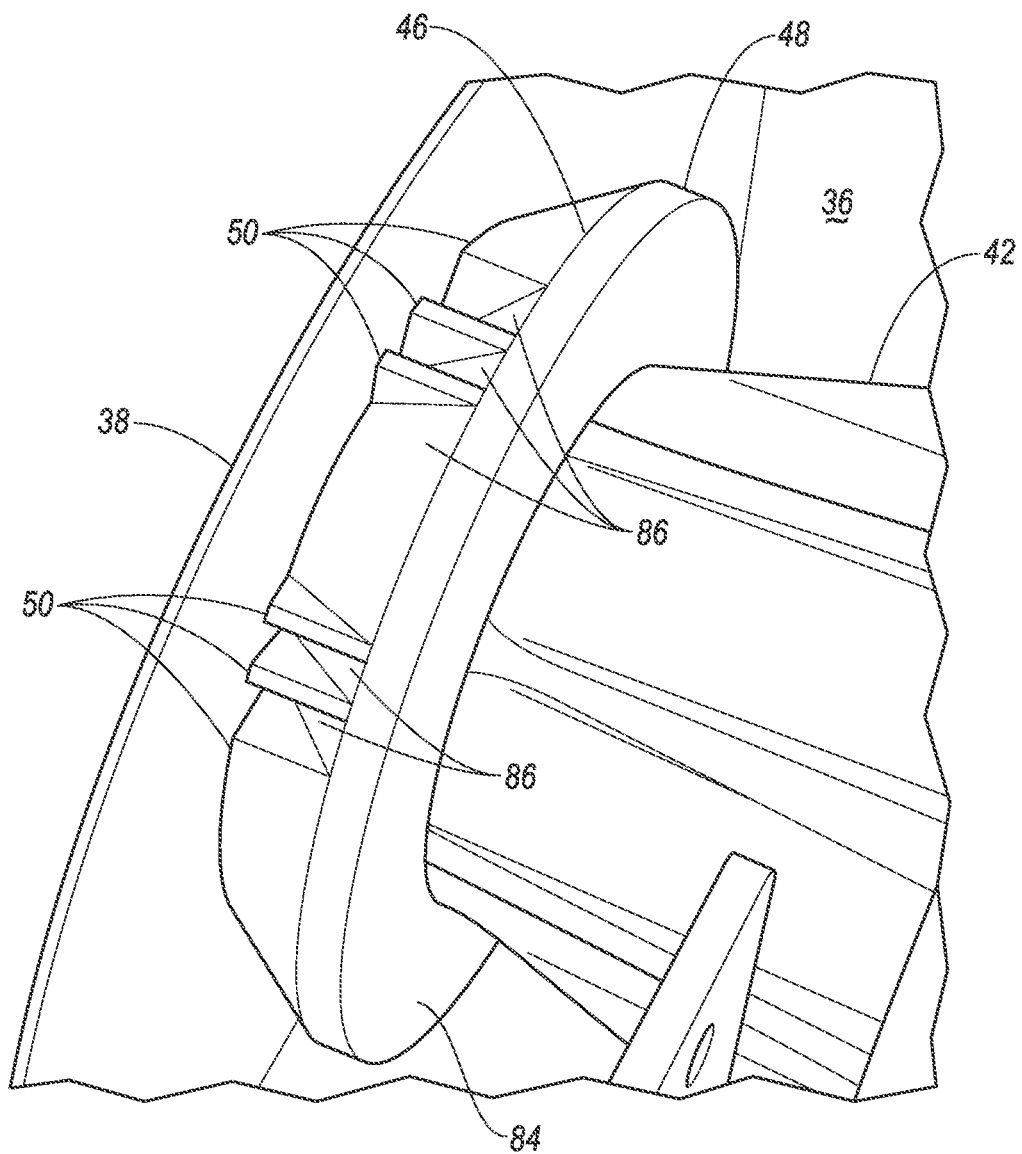
FIG. 8 is a perspective view of the sensor and disc inside the housing.
Figure 9:
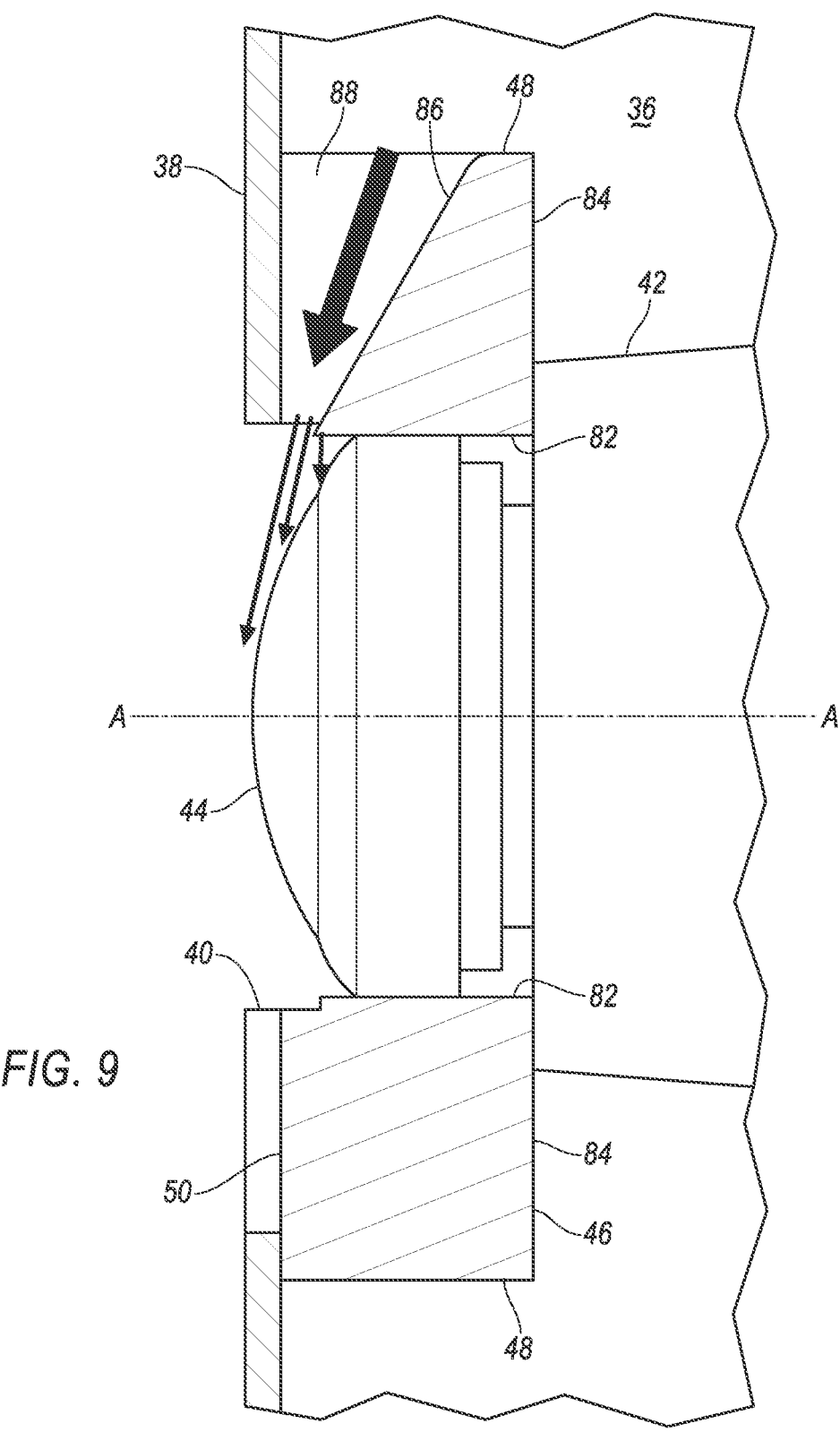
FIG. 9 is a cross-sectional side view of the sensor, the disc, and the housing.

With reference to FIGS. 8 and 9, each disc 46 may have a toroidal shape defining an axis A (illustrated in FIG. 9). The axis A passes through a center of the respective lens 44. The disc 46 includes the radially outer edge 48, a radially inner surface 82, a back surface 84, and a front surface 86.

The radially inner surface 82 extends circumferentially around the axis A and faces radially inwardly toward the axis A. The radially inner surface 82 is closer to the axis A than the radially outer edge 48. The disc 46 is attached to the sensor 42 at the radially inner surface 82.

The radially outer edge 48 extends circumferentially around the axis A and is farther from the axis A than the rest of the disc 46. The radially outer edge 48 is disposed in the first chamber 36 and spaced from the housing 34. The radially outer edge 48 is contactlessly exposed to the first chamber 36. For the purposes of this disclosure, "A is exposed to B" means that a surface A is disposed within a volume defined and enclosed by a structure B without intermediate components shielding the surface A from the structure B. For the purposes of this disclosure, "contactlessly" means without touching a solid object.

The back surface 84 faces away from the nearest portion of the panel 38. The back surface 84 extends circumferentially around the axis A and extends from the radially inner surface 82 to the radially outer edge 48. The back surface 84 may be flat. The back surface 84 is disposed in the first chamber 36 and spaced from the housing 34. The back surface 84 is contactlessly exposed to the first chamber 36.

The front surface 86 faces toward the nearest portion of the panel 38. The front surface 86 extends circumferentially around the axis A, interrupted by the vanes 50. The front surface 86 extends from the radially inner surface 82 to the radially outer edge 48. The front surface 86 slopes away from the nearest portion of the panel 38 from the radially inner surface 82 to the radially outer edge 48. For example, the front surface 86 has a frustoconical or partially frustoconical shape around the axis A. The front surface 86 may have an angle measured from the axis A of approximately 45°.

Figure 10A:
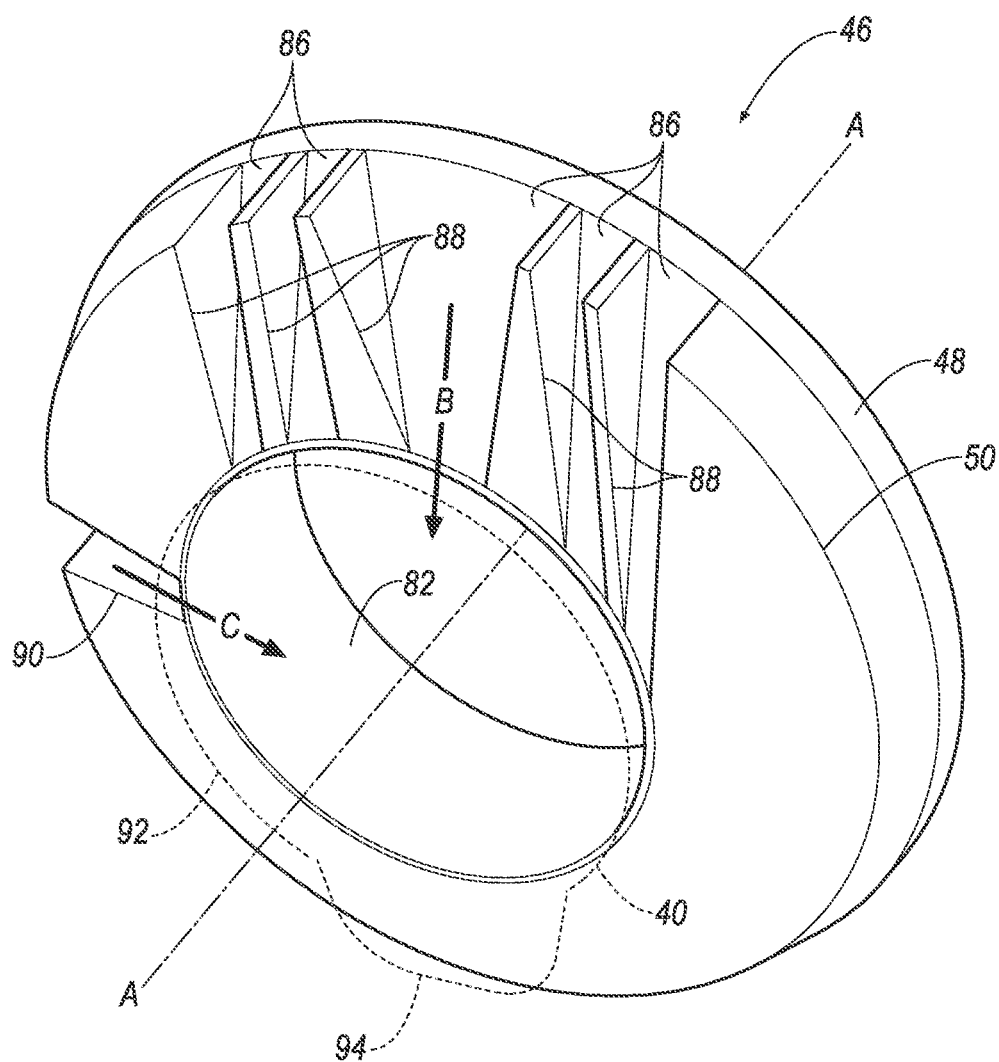
FIG. 10A is a perspective view of the disc.
Figure 10B:
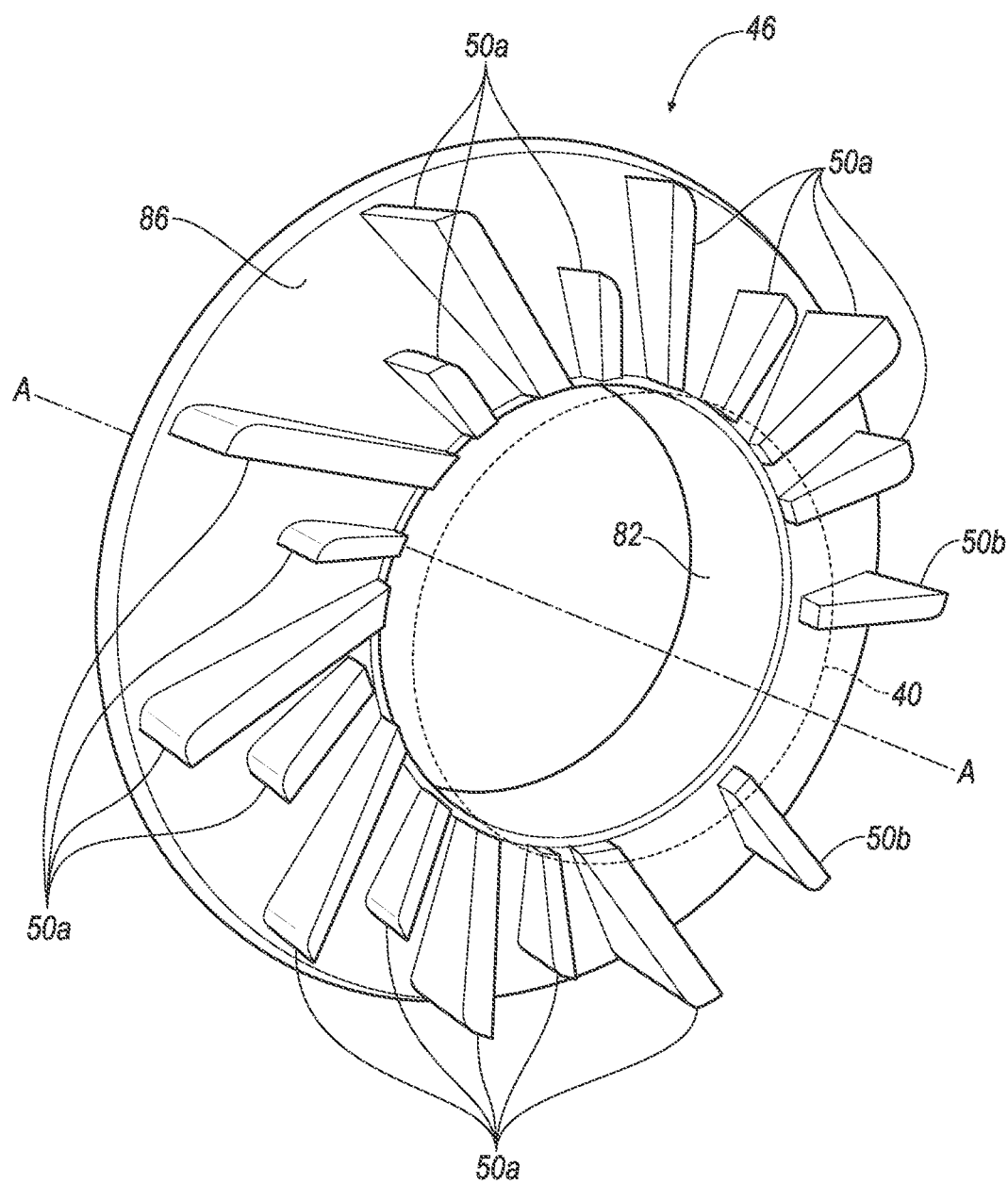
FIG. 10B is a perspective view of another example disc.

With reference to FIGS. 10A and 10B, at least three vanes 50 extend from the disc 46, e.g., from the front surface 86 of the disc 46, to the panel 38. At least some of the vanes 50 extend from the radially inner surface 82 to the radially outer edge 48. Some of the vanes 50 may extend from the radially inner surface 82 partially toward the radially outer edge 48. The vanes 50 are arranged radially asymmetrically around the disc 46, i.e., around the axis A. For the purposes of this disclosure, "radially asymmetrically" means arranged around an axis such that no sector of less than 180° that is evenly divisible into 360° can be repeated for 360° around the axis. The radially asymmetric arrangement of the vanes 50 can prevent a dead spot from forming in the center of the lens 44, which can help completely dry the lens 44.

For example, with reference to FIG. 10A, the vanes 50 define a plurality of first openings 88 and a second opening 90. The first openings 88 and the second opening 90 are each constituted by the front surface 86, two vanes 50, and the panel 38. There are at least three openings, e.g., five openings, as shown in FIG. 10A. The first openings 88 have a combined outlet area, i.e., a sum of cross-sectional areas where the airflow exits the first openings 88, that is greater than an outlet area of the second opening 90. The first openings 88 are positioned to direct airflow from the first chamber 36 in substantially a same first direction B across the lens 44. The second opening 90 is positioned to direct airflow from the first chamber 36 across the lens 44 in a second direction C transverse to the first direction B. The second direction C is at an acute angle with the first direction B. The vanes 50 are positioned to block airflow from the first chamber 36 through the aperture 40 except through the first openings 88 and the second opening 90; in other words, the first openings 88 and the second opening 90 provide the one and only airflow path from the first chamber 36 through the aperture 40. For example, one of the vanes 50 extends more than 180° around the axis A from the second opening 90 to the one of the first openings 88.

The aperture 40 includes a circular portion 92 substantially centered on the lens 44, i.e., substantially centered on the axis A. The aperture 40 also includes an extension portion 94. The extension portion 94 extends in the first direction B from the circular portion 92. The extension portion 94 is lobe-shaped. The extension portion 94 has a smaller area than the circular portion 92. The extension portion 94 allows the airflow from the first openings 88 to smoothly exit.

For another example of radially asymmetric vanes 50, with reference to FIG. 10B, the vanes 50 include first vanes 50a and second vanes 50b. The first vanes 50a are arranged radially symmetrically for at least 270° around the disc 46, i.e., at least 270° around the axis A. For the purposes of this disclosure, "radially symmetric" means arranged around an axis such that a sector of less than 180° repeats for the specified sweep (e.g., 270°) around the axis. As shown in FIG. 10B, a sector of 33.75° covers a pattern of two first vanes 50a of different lengths, and that sector repeats eight times covering a sweep of 270°. The first vanes 50a are elongated in a radial and circumferential direction relative to the axis A, i.e., in a direction extending both away from the axis A and rotating around the axis A. The second vanes 50b are arranged around a remainder of the disc 46 than the first vanes 50a, i.e., a sweep of 90° outside of the sweep of 270° of the first vanes 50a. The second vanes 50b are elongated in a radial direction relative to the axis A. The second vanes 50b are each spaced farther from the circumferentially adjacent second vanes 50b than the first vanes 50a are spaced from the circumferentially adjacent first vanes 50a.

The apertures 40 are circular in shape. The apertures 40 are substantially centered on the axis A.

For the examples in both FIG. 10A and FIG. 10B, in operation, the pressure source 74 draws in air from the ambient environment and directs the air to the first chamber 36. The pressure source 74 causes the pressure of the first chamber 36 to increase above the atmospheric pressure outside the housing 34. The increased pressure forces air between the vanes 50 from the first chamber 36 through the aperture 40 to the ambient environment, e.g., through the first openings 88 and second opening 90, or between the first vanes 50a and second vanes 50b. The airflow across the lens 44 can remove debris from the lens 44 as well as prevent debris from contacting the lens 44. Moreover, the airflow can dry the lens 44 and prevent moisture such as rain from contacting the lens 44. The radially asymmetric arrangement of the vanes 50 causes the airflow to be unbalanced across the lens 44, while still covering the entirety of the lens 44. The unbalanced airflow prevents dead spots, i.e., regions of still air, from forming. The autonomous operation of the vehicle 30 can be improved by having the sensors 42 with unobstructed fields of view.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. An apparatus comprising:
   a housing defining a chamber and including a panel including an aperture;
   a sensor fixed inside the chamber and having a field of view through a lens and the aperture;
   an annular disc attached to the sensor concentrically around the lens and including a radially outer edge contactlessly exposed to the chamber; and
   at least three vanes extending from the disc to the panel and arranged radially asymmetrically around the disc, the vanes positioned to direct airflow from the chamber across the lens.

2. The apparatus of claim 1, wherein the vanes define a plurality of first openings positioned to direct airflow from the chamber in substantially a same first direction across the lens, and a second opening positioned to direct airflow from the chamber across the lens in a second direction transverse to the first direction.

3. The apparatus of claim 2, wherein the vanes are positioned to block airflow from the chamber through the aperture except through the first openings and the second opening.

4. The apparatus of claim 2, wherein the second direction is at an acute angle with the first direction.

5. The apparatus of claim 2, wherein the plurality of first openings includes at least three first openings.

6. The apparatus of claim 2, wherein the aperture includes a circular portion substantially centered on the lens and an extension portion.

7. The apparatus of claim 6, wherein the extension portion extends in the first direction from the circular portion.

8. The apparatus of claim 1, wherein the vanes include first vanes arranged radially symmetrically for at least 270° around the disc.

9. The apparatus of claim 8, wherein the first vanes are each elongated in a radial and circumferential direction.

10. The apparatus of claim 8, wherein the vanes include second vanes arranged around a remainder of the disc radially asymmetrically with the first vanes.

11. The apparatus of claim 10, wherein the second vanes are elongated in a radial direction.

12. The apparatus of claim 1, wherein the disc includes a radially inner surface at which the disc is attached to the sensor.

13. The apparatus of claim 12, wherein the disc includes a front surface sloping away from the panel from the radially inner surface to the radially outer edge.

14. The apparatus of claim 12, wherein the disc includes a back surface facing away from the panel and extending from the radially inner surface to the radially outer edge, wherein the back surface is contactlessly exposed to the chamber.

15. The apparatus of claim 1, further comprising a pressure source positioned to raise a pressure of the chamber above an atmospheric pressure.

16. The apparatus of claim 15, wherein the pressure source is a blower.

17. The apparatus of claim 1, wherein the lens is convex.

18. The apparatus of claim 1, wherein the panel has a cylindrical shape.

19. The apparatus of claim 1, wherein the sensor is a first sensor, the aperture is a first aperture, the lens is a first lens, the apparatus further comprising a second sensor fixed inside the chamber, wherein the panel includes a second aperture, and the second sensor includes a second lens defining a field of view oriented through the second aperture.

20. The apparatus of claim 19, wherein the disc is a first disc, the radially outer edge is a first radially outer edge, and the vanes are first vanes, the apparatus further comprising an annular second disc attached to the second sensor concentrically around the second lens and including a second radially outer edge contactlessly exposed to the chamber, and at least three second vanes extending from the second disc to the panel and arranged radially asymmetrically around the second disc.

* * * * *